US010482486B2

(12) United States Patent
Osvald et al.

(10) Patent No.: US 10,482,486 B2
(45) Date of Patent: *Nov. 19, 2019

(54) DETACHED ECONOMY IN ONLINE GAME

(71) Applicant: Zynga Inc., San Francisco, CA (US)

(72) Inventors: John Osvald, Albany, CA (US);
Michael Waite, Alamo, CA (US); Kyle Sauger, Burlingame, CA (US); Lauren Duncan, San Francisco, CA (US); Erik Nilsson, South San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,714

(22) Filed: Jan. 15, 2019

(65) Prior Publication Data
US 2019/0147473 A1 May 16, 2019

Related U.S. Application Data

(63) Continuation of application No. 13/196,280, filed on Aug. 2, 2011, now Pat. No. 10,181,127.

(51) Int. Cl.
*G06Q 10/00* (2012.01)
*G06Q 30/02* (2012.01)
(Continued)

(52) U.S. Cl.
CPC ......... *G06Q 30/0209* (2013.01); *G06Q 20/06* (2013.01); *G07F 17/32* (2013.01)

(58) Field of Classification Search
CPC ..... G06Q 30/0209; G06Q 20/06; G07F 17/32
(Continued)

(56) References Cited

U.S. PATENT DOCUMENTS

2003/0204566 A1* 10/2003 Dhupelia ............... A63F 13/12
709/205
2010/0056273 A1* 3/2010 Reville .................. A63F 13/00
463/31
(Continued)

OTHER PUBLICATIONS

Stenstrom, Christopher Distrig. Gameplay Design for Role-Playing Battle Systems Master of Science Thesis. Department of Applied Information Technology, Chalmers University of Technology, Gothenburg, Sweden, Jun. 2012. (Year: 2012) (Year: 2012).*

*Primary Examiner* — Patrick McAtee
*Assistant Examiner* — Shaun D Sensenig
(74) *Attorney, Agent, or Firm* — Penilla IP, APC

(57) ABSTRACT

Methods, systems, and computer programs for generating revenue in an online game are presented. One method includes an operation for executing a first video game having a first currency enabling a user to achieve advancement in the first video game. The method also includes an operation for executing a second video game that is an autonomous game module within the first video game, the second video game enables the user to select one or more assets from the first video game for use in the second video game but limits the number of assets such that the one or more assets are insufficient to complete the second video game. The method further includes operations for detecting completion of the second video game and selecting one or more reward assets for use in the first video game and for transferring the one or more reward assets to the first video game for the user to use to achieve the advancement in the first video game.

20 Claims, 13 Drawing Sheets

(51) Int. Cl.
*G07F 17/32* (2006.01)
*G06Q 20/06* (2012.01)

(58) Field of Classification Search
USPC .................................................. 705/319, 1.1
See application file for complete search history.

(56) References Cited

U.S. PATENT DOCUMENTS

2011/0107239 A1* 5/2011 Adoni ..................... A63F 13/12
715/757
2011/0264489 A1* 10/2011 Ganetakos ............. G06Q 30/02
705/12

\* cited by examiner

DETACHED ECONOMY IN ONLINE GAME

CLAIM OF PRIORITY

This application is a continuation of U.S. patent application Ser. No. 13/196,280, filed Aug. 2, 2011, and entitled "Detached Economy in Online Game," which is incorporated herein by reference.

BACKGROUND

1. Field of the Invention

The present invention relates to methods for playing online social games, and more particularly, methods, systems, and computer programs for generating revenue in an online game.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

Many online games have in-game currencies (e.g., betting currency in card games) for making progress in the game (e.g., betting) or for purchasing game items (e.g., buying a virtual drink), and different types of virtual currencies may coexist in the same game (e.g., chips and casino gold). In general, currency may be bought using real currency or may be earned during the game. Some virtual currencies (e.g., New York Dollars, Cuban Pesos, and Moscow Rubles used in Zynga Game Networks Mafia Wars game) may not be exchanged between each other, while other virtual currency types may be exchanged in game-defined ways (e.g., Reward Points may be used to purchase New York Dollars, but New York Dollars may not be used to purchase Reward Points).

In some instances, players accumulate so much virtual currency in a game that the players do not need to buy more virtual currency to play the game, limiting the revenue opportunities for the online game operators. Sometimes players amass large amounts of currency by using game exploits, commonly referred to as "cheats."

It is in this context that embodiments arise.

SUMMARY

Embodiments of the present invention provide methods, systems, and computer programs for generating revenue in an online game are presented. In one embodiment, a method includes an operation for executing, at a server, a first video game for play by a user of a client device, the first video game having a first currency enabling the user to achieve advancement in the first video game. The method also includes an operation for executing, at the server, a second video game that an autonomous game module within the first video game, the second video game enables the user to select one or more assets from the first video game for use in the second video game, the second video game limiting a number of assets the user is able to select such that when selected, the one or more assets are insufficient to complete the second video game, wherein the second video game has a second currency enabling the user to achieve advancement in the second video game, and wherein the first currency is prevented from enabling the user to achieve the advancement in the second video game and the second currency is prevented from enabling the user to achieve the advancement in the first video game. Moreover, the method includes an operation for detecting, at the server, completion of the second video game by the user and selecting one or more reward assets for use in the first video game, the one or more reward assets are different from the one or more assets selected from the first video game for use in the second video game. Further yet, the method includes an operation for transferring the one or more reward assets to the first video game for the user to use to achieve the advancement in the first video game.

In another embodiment, a server system for hosting a first video game and a second video game that is an autonomous game module within the first video game for play by a user on a client device is provided. The server system includes a memory for storing instructions for executing the first video game and instructions for executing the second video game, the first video game having a first currency enabling the user to achieve advancement in the first video game. The server system also includes a processor operable to execute the instructions for the first video game and the instructions for the second video game. According to this embodiment, the processor is operable to initiate the first video game having the first currency. Additionally, the processor is operable to initiate the second video game, the second video game enables the user to select one or more assets from the first video game for use in the second video game, the second video game limiting a number of assets the user is able to select such that when selected, the one or more assets are insufficient to complete the second video game, wherein the second video game has a second currency enabling the user to achieve advancement in the second video game, and wherein the first currency is prevented from enabling the user to achieve the advancement in the second video game and the second currency is prevented from enabling the user to achieve the advancement in the first video game. Furthermore, the processor is operable to detect completion of the second video game by the user and select one or more reward assets for use in the first video game, the one or more reward assets are different from the one or more assets selected from the first video game by the user for use in the second video game. Moreover, the processor of the server system is operable to transfer the one or more reward assets to the first video game for the user to use to achieve the advancement in the first video game.

In yet another embodiment, a non-transitory computer-readable storage medium storing a computer program executable by a processor-based system is provided. The computer program includes program instructions for executing a first video game for play by a user of a client device, the first video game having a first currency enabling the user to achieve advancement in the first video game. Further, the computer program includes program instructions for executing a second video game that an autonomous game module within the first video game, the second video game enables the user to select one or more assets from the first video game for use in the second video game, the second video game limiting a number of assets the user is able to select such that when selected, the one or more assets are insufficient to complete the second video game, wherein the second video game has a second currency enabling the user to achieve advancement in the second video game, and wherein the first currency is prevented from enabling the user to achieve the advancement in the second video game and the second currency is prevented from enabling the user to achieve the advancement in the first video game. Additionally, the computer program includes program instructions for detecting completion of the second video game by the user and selecting one or more reward assets for use in the first video game, the one or more reward assets are different from the one or more assets selected from the first video game for use in the second video game. Moreover, the computer program includes program instructions for transferring the one or more reward assets to the first video game for the user to use to achieve the advancement in the first video game.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process operations and structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

BRIEF DESCRIPTION OF THE DRAWINGS

The invention may best be understood by reference to the following description taken in conjunction with the accompanying drawings.

DETAILED DESCRIPTION

The following embodiments describe methods, systems, and computer programs for generating revenue in an online game. It will be apparent, that the present embodiments may be practiced without some or all of these specific details. In other instances, well known process operations have not been described in detail in order not to unnecessarily obscure the present embodiments.

Figure 1:
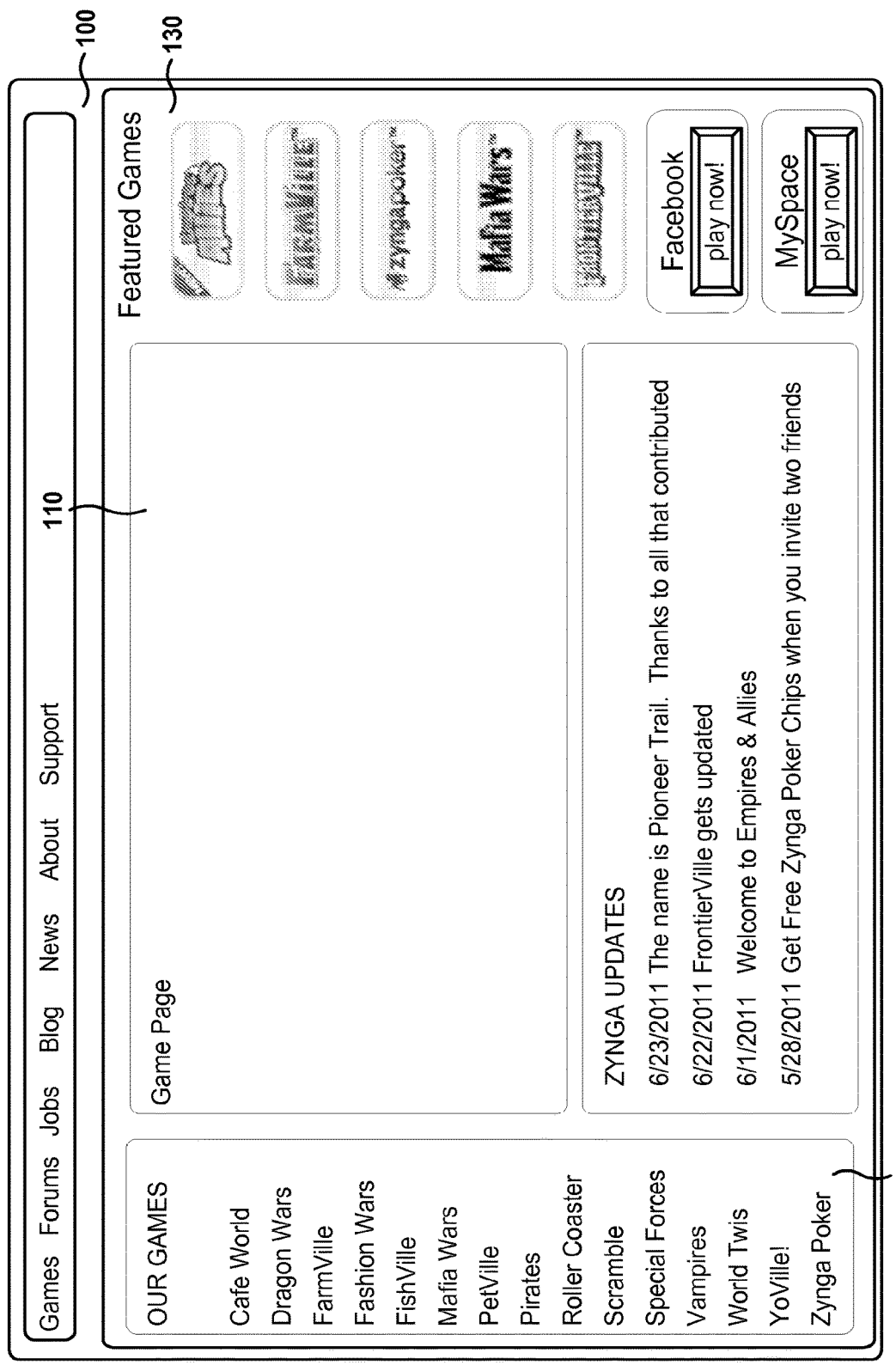
FIG. 1 illustrates an embodiment of a web page for playing an online game.

FIG. 1 illustrates an embodiment of a web page 100 for playing an online game. A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device. Some web pages are dynamic and are constructed at the time the web page is requested by a network user. As a result, the actual content included in dynamic web pages may vary over time. In addition, web pages may include multimedia content (e.g., image, video, or audio), or embedded references thereto, as well as text content.

Web page 100 is one embodiment of a page designed for playing games online via web browsers. In this embodiment, a list of games 120 is presented for selection by the player, and a list of featured games 130 identifies popular games. In one embodiment, the game is played in game area 110 as an embedded component that may use any technology for presenting multimedia dynamic content, such as Hyper Text Markup Language 5 (HTML5), Adobe Flash™, etc.

Adobe Flash (formerly known as Macromedia Flash) is a multimedia platform for adding animation and interactivity to web pages. A Flash component (e.g., game area 110) may be embedded in a web page (e.g., web page 100) to create animation, advertisements, or games and to integrate video into the web page. Adobe Flash can manipulate vector and raster graphics and support bidirectional streaming of audio and video. In one embodiment, Adobe Flash libraries are used with the Extensible Markup Language (XML) capabilities of the web browsers to render rich content in the browsers. This technology is known as Asynchronous Flash and XML.

Another technology for displaying dynamic content in a web page is HTML5. HTML5's features include media playback and offline storage. With a predecessor version to HTML5, named HTML4, sites have to reach for Adobe Flash (or Silverlight) to show a video or play music. However, HTML5 lets sites directly embed media using HTML tags (e.g., "<video>" and "<audio>"), and plugins are not required.

In one embodiment, games include objects, such as characters, currencies, tools, assets, social relations, etc. For example, in a war game, the characters may be the soldiers fighting on respective sides of the war. In addition, there may be weapons used by the soldiers and objects around the battlefield (e.g., buildings, trees, animals, mountains, rivers, and so on). Each game object may be defined according to a predetermined syntax. For example, the definition of a game object may include shape, texture, physical capabilities, connection or relationship with other game objects, etc.

In another embodiment, a game application is embedded in a web page (e.g., web page 100) and the players play the game via web browsers. The display of a game is sometimes referred to as the "stage" of the game. Thus, the stage of the game may be implemented as Adobe Flash or HTML5 component embedded in the web page. For example, the stage is essentially a data structure that defines some of the basic elements of the game, such as aspect ratio and display size. At any given time, a game scene may be rendered and displayed on the stage by attaching one or more game objects to the stage.

Figure 2:
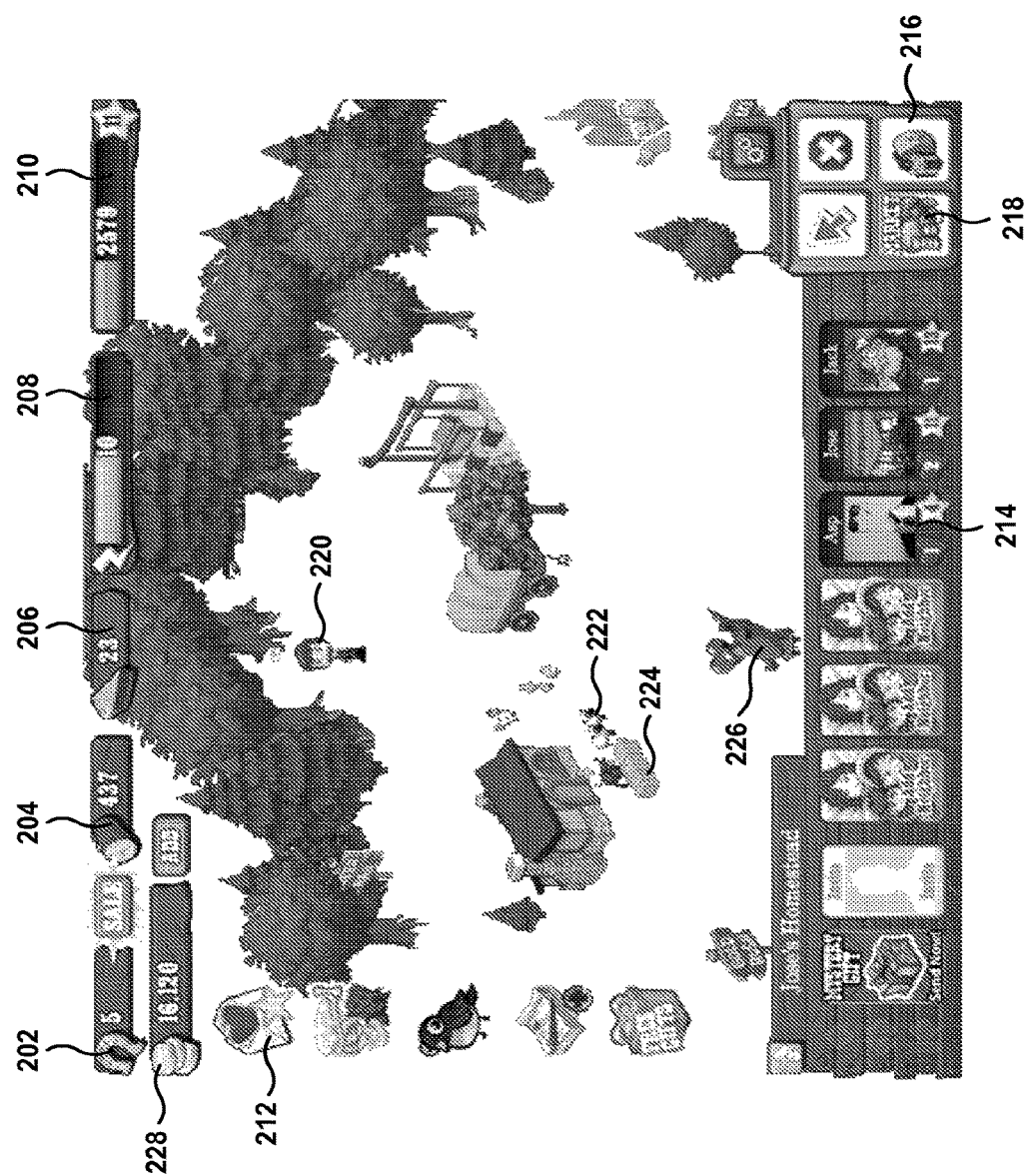
FIG. 2 shows the stage of an online game, according to one embodiment.

FIG. 2 shows the stage of an online game, according to one embodiment. The online game of FIG. 2 can be played in game area 110 of FIG. 1, but the online game can also be played in other environments. The game includes avatar 220, which can be manipulated by the player, such as by clicking the mouse around the play area. For example, if the mouse is clicked somewhere far away from the avatar, the avatar is moved to the faraway place, unless the mouse is clicked on some other game object that causes an in-game action (e.g., if the mouse is clicked on an animal, the avatar feeds the animal).

As the player advances in the game, the player acquires assets, which can take multiple forms. In one embodiment, assets include first virtual currency asset 202, second virtual currency 228, wood asset 204, food asset 206, energy asset 208, sheep asset 222, haystack asset 224, dancing bear asset 226, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 202 can be used during the game to make progress, also referred to herein as advancement. The first virtual currency 202 can be used to acquire assets (e.g., animals or crops), to remove an obstacle in the game (e.g., enabling progress that would otherwise be blocked), or to complete a task (e.g., finish decorating a house).

In particular embodiments, the first and the second virtual currencies are used for different purposes, although some assets may be bought with either of the currencies. The first virtual currency has higher purchasing value than the second virtual currency. For example the first virtual currency can unblock some obstacles in the game that the second virtual currency cannot. Although a small amount of first virtual currency might be given to the player as the game starts, a player needs to purchase more first virtual currency with real currency, also referred to herein as legal currency, real-world currency, or real cash. This provides a revenue stream for the online game provider.

In one embodiment, virtual currency may be redeemable outside of an indentified game network for real world items, non-virtual items, charitable donations, or paid sponsor benefits (e.g., a 6-month magazine subscription). In another embodiment, virtual currency may be redeemable (one way) or exchangeable (two ways) for meta-virtual currencies (for example, Facebook Credits).

Some multiuser online games are styled after casino gambling games (e.g., poker, roulette, slot machines, etc.). In a gambling game, players generally obtain virtual currency for their character's use in the gambling game. In some gambling games and in other online games, players purchase virtual currency in exchange for legal currency, where the legal currency is transferred using a credit, debit, or charge card transaction conveyed over a financial network. In such games, the virtual currency might be represented by virtual poker chips or by a number or value stored by the server for that player's benefit. A player interacts with the game server such that the player (or a character controlled by the player) plays a gambling game in hopes of increasing the amount of virtual currency.

In one embodiment, the online game includes missions 212, which identify one or more tasks that the player must complete before the mission is considered satisfied or finished. For example, a mission may require three tasks: chopping down a tree, feeding an animal, and planting an apple tree. Upon completion of the mission, the player is rewarded in some fashion, such as providing a new asset, increasing the amount of energy, getting more virtual currency, etc. As the player completes tasks and missions, the game score 210 is increased, and as the game score increases the experience level may also increase.

In one embodiment, the avatar is given an amount of energy as the game starts, and each action that the avatar performs consumes energy. Once the energy runs out, the avatar cannot perform some of the game actions. The amount of energy is increased periodically, or can also be increased by trading virtual currency for energy, by consuming food, or as a bonus obtained during game play.

Clicking on inventory icon 216 causes the online game to display a list of all the items or assets owned by the player. In addition, clicking on marketplace icon 218 takes the player to a virtual marketplace where assets can be acquired. As described above, assets can be from within different categories such as crops, trees, animals, buildings, decorations, energy, special items, weapons, etc. Each category includes a plurality of assets within the category. For example, the animal category includes ducks, chickens, goats, sheep, pigs, etc. Some of the items within a category can be freely acquired by the player, while purchasing of some items can be blocked until certain game condition is met, such as reaching some score, finishing a mission, purchasing the ability to unblock the blocked item, etc.

In one embodiment, avatar 220 might be personalized by the player, i.e., the avatar is defined by a personal expression configured by the player. The personal expression may include type of skin, hair color, mouth, eyes, gender, age, clothing, etc. In one embodiment, the personal expression can be improved by acquiring personal-expression assets, such as fancy clothing (e.g., shoes, suits, hats). Acquisition of personal-expression items is made with virtual currency, in one embodiment.

In one embodiment, the online game is an online social game, which leverages social relationships between the player and other online game players socially linked to the player. For example, the player might add a neighbor to the game by inviting a friend from a social networking site. There are many types of online social networks run and maintained by various companies, and any one of these companies can provide access to social graph data. One such company, without limitation to others, may include Facebook. Once a friend accepts being a neighbor, a social relationship is established in the game where the game played by the player and the game played by the neighbor can interact with each other. For example, the player might visit the home of the neighbor and perform some game activities therein, and will be rewarded for doing so. Some of the missions in the game might include social activities that promote the interaction between players. For example, one mission might include planting tomatoes in the neighbor's farm. Therefore, the social interaction can provide advancement for the player and for the neighbor.

It is noted that the embodiments illustrated in FIG. 2 are exemplary. Other embodiments may utilize different assets, missions, social interactions, etc. The embodiments illustrated in FIG. 2 should therefore not be interpreted to be exclusive or limiting, but rather exemplary or illustrative.

Figure 3:
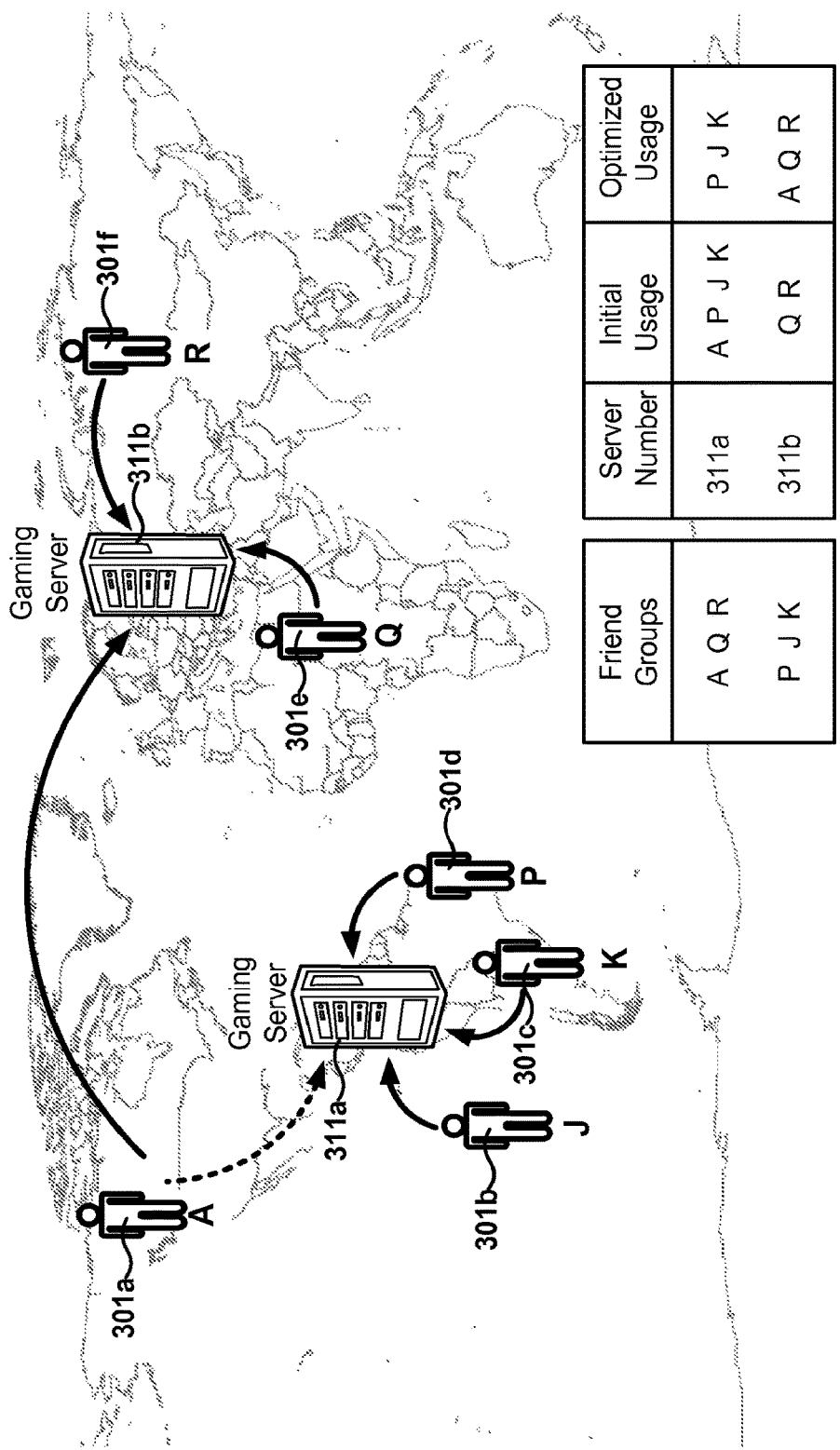
FIG. 3 shows a block diagram illustrating an embodiment of an online-game management architecture.

FIG. 3 shows a block diagram illustrating an embodiment of an online-game management architecture. To encourage desired behaviors (e.g., be more social, spend more money, etc.), online game operators may use social graph information associated with players to determine how players may use their real currency or virtual currency. For example, a player who invites many friends in the user's social graph to play a game may be rewarded with more favorable currency conversion rates and allowed to exchange between more currency types than a player who invited few friends. In another example, a player who helps many friends play the game (e.g., visits, sends gifts, does work for a friend) may be rewarded with special coins that facilitate access to exclusive items, abilities, areas, or the like.

In some implementations, a player of a multi-player online game, (e.g., player A 301a) may play online games with his friends (e.g., player Q 301e and player R 301f). Similarly, player P 301d may have friends player J 301b and player K 301c, which means that player P may play online games with players J and K. In some embodiments, a plurality of gaming servers execute, also referred to as host, the gaming application for the friend groups (e.g., {A, Q, R} and {P, J, K}). In the embodiment of FIG. 3, gaming servers 311a and 311b host the player groups.

Players within a single friend group may be hosted by different gaming servers, while playing the same game with each other, or may be hosted by the same gaming server. In one scenario, players A, Q, and R are playing the same game with each other. Initially, gaming server 311a hosts player A and gaming server 311b hosts players Q and R. However, during game play, player A may be moved to gaming server 311b so the three players A, Q, and R are hosted by the same gaming server.

In some implementations, a gaming server (e.g., 311a, 311b) may host players from a plurality of player groups. For example, gaming server 311a may be hosting player A from group {A, Q, R} and players P, J, and K from group {P, J, K}. The gaming server performs computations necessary to provide gaming services for each of the hosted players, and provides responses to various queries provided by the hosted players. In some embodiments, a hosted player may observe gaming server response times for each of the user's queries that are dependent on the number of players hosted by the gaming server when the player presents the queries to the gaming server.

In one embodiment, a gaming server may identify an overloaded gaming server. In the scenario of FIG. 3, gaming server 311a is overloaded while hosting players A, P, J and K. The gaming platform may transfer one or more players hosted by the overloaded gaming server to other gaming servers, so as to reduce the load experienced by the currently overloaded gaming server. For example, player A is transferred from gaming server 311a to gaming server 311b. In one embodiment, players may be transferred based on the social network and online behavioral activities of the user. For example, player A is identified as a transfer candidate to gaming server 311b based on player A's friendship with players Q and R already hosted by gaming server 311b, or based on the observation that player A's gaming times overlap with those of players Q and R already hosted by gaming server 311b.

Figure 4:
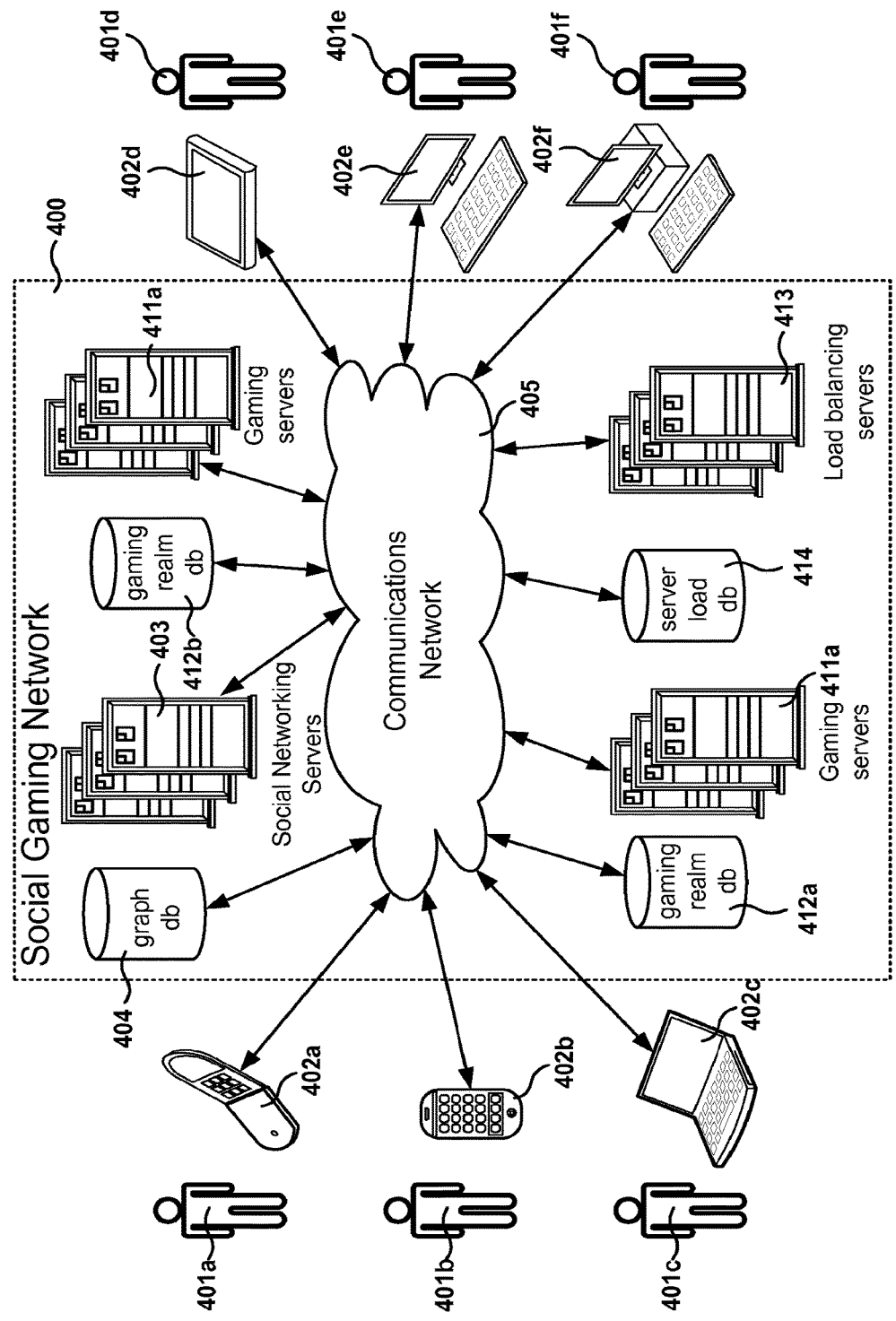
FIG. 4 shows a block diagram illustrating a social gaming network architecture, according to one embodiment.

FIG. 4 shows a block diagram illustrating a social gaming network architecture, according to one embodiment. In some implementations, a plurality of players (e.g., 401a-401f) may be utilizing a social gaming network 400. Each player interacts with the social gaming network via one or more client devices (e.g., client devices 402a-402f). The clients may communicate with each other and with other entities affiliated with the gaming platform via communications network 405. Further, the players may be utilizing a social networking service provided by a social networking server (e.g., social networking servers 403) to interact with each other.

When a player provides an input into the player's client device, the client device may in response send a message via the communications network to the social networking server. The social networking server may update the player profile, save the message to a database, send messages to other players, etc. The social gaming network may include a social graph database 404, which stores player relationships, social player profiles, player messages, and player social data.

The gaming servers host one or more gaming applications, and perform the computations necessary to provide the gaming features to the players and clients. One or more gaming realm databases (e.g., 412a-412b) store data related to the gaming services, such as the gaming applications and modules, virtual gaming environment ("realm") data, player gaming session data, player scores, player virtual gaming profiles, game stage levels, etc. The gaming servers may utilize the data from the gaming realm databases to perform the computations related to providing gaming services for the players. In some implementations, a server load database 414b stores gaming server load statistics, such as computational load, server responses times, etc. The social gaming network may include a load balancing server 413.

Figure 5:
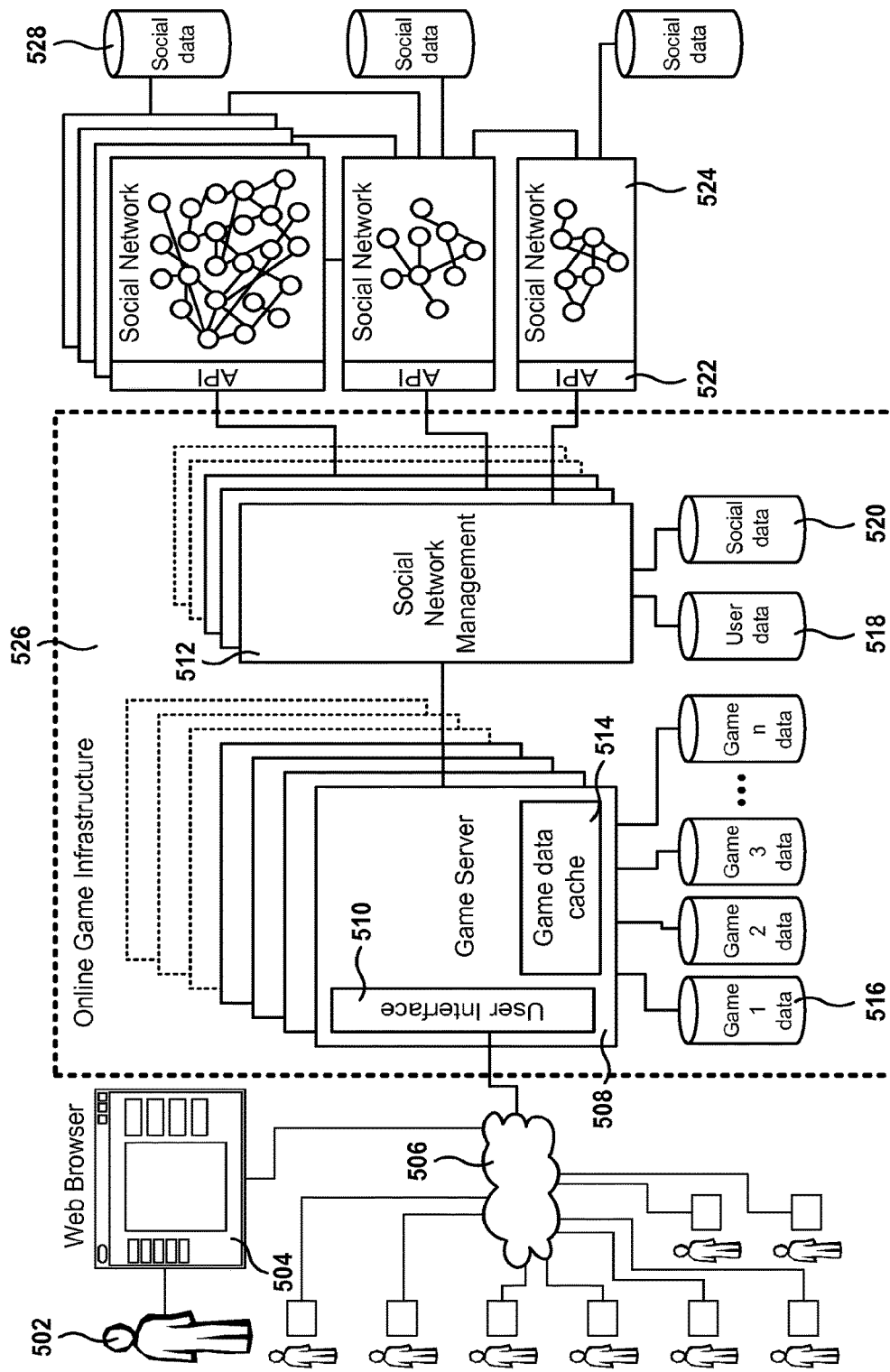
FIG. 5 illustrates an implementation of a Massively Multiplayer Online (MMO) infrastructure, according to one embodiment.

FIG. 5 illustrates an implementation of an online game infrastructure, according to one embodiment. The online game infrastructure 526 includes one or more game servers 508, web servers (not shown), one or more social network management servers 512, and databases to store game related information. In one embodiment, game server 508 provides a user interface 510 for players 502 to play the online game. In one embodiment, game server 508 includes a Web server for players 502 to access the game via web browser 504, but the Web server may also be hosted in a server different from game server 508. Network 506 interconnects players 502 with the one or more game servers 508.

Each game server 508 has access to one or more game databases 516 for keeping game data. In addition, a single database can store game data for one or more online games. Each game server 508 may also includes one or more levels of caching. Game data cache 514 is a game data cache for the game data stored in game databases 516. For increased performance, caching may be performed in several levels of caching. For instance, data more frequently used is stored in a high priority cache, while data requiring less access during a session will be cached and updated less frequently.

The number of game servers 508 changes over time, as the gaming platform is an extensible platform that changes the number of game servers according to the load on the gaming infrastructure. As a result, the number of game servers will be higher during peak playing times, and the number of game servers will be lower during off-peak hours.

In one embodiment, the increase or decrease of bandwidth is executed automatically, based on current line usage or based on historical data.

One or more social network management servers 512 provide support for the social features incorporated into the online games. The social network management servers 512 access social data 528 from one or more social networks 524 via Application Programming Interfaces (API) 522 made available by the social network providers. Each social network 524 includes social data 528, and this social data 528, or a fraction of the social data, is made available via API 522. As in the case of the game servers, the number of social network management servers 512 that are active at a point in time changes according to the load on the infrastructure. As the demand for social data increases, the number of social network management servers 512 increases. Social network management servers 512 cache user data in database 518, and social data in database 520. The social data might include the social networks where a player is present, the social relationships for the player, the frequency of interaction of the player with the social network and with other players, etc. Additionally, the user data kept in database 518 may include the player's name, demographics, e-mail, games played, frequency of access to the game infrastructure, etc.

It is noted that the embodiment illustrated in FIG. 5 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 5 should therefore not be interpreted to be exclusive or limiting, but rather exemplary or illustrative.

Figure 6:
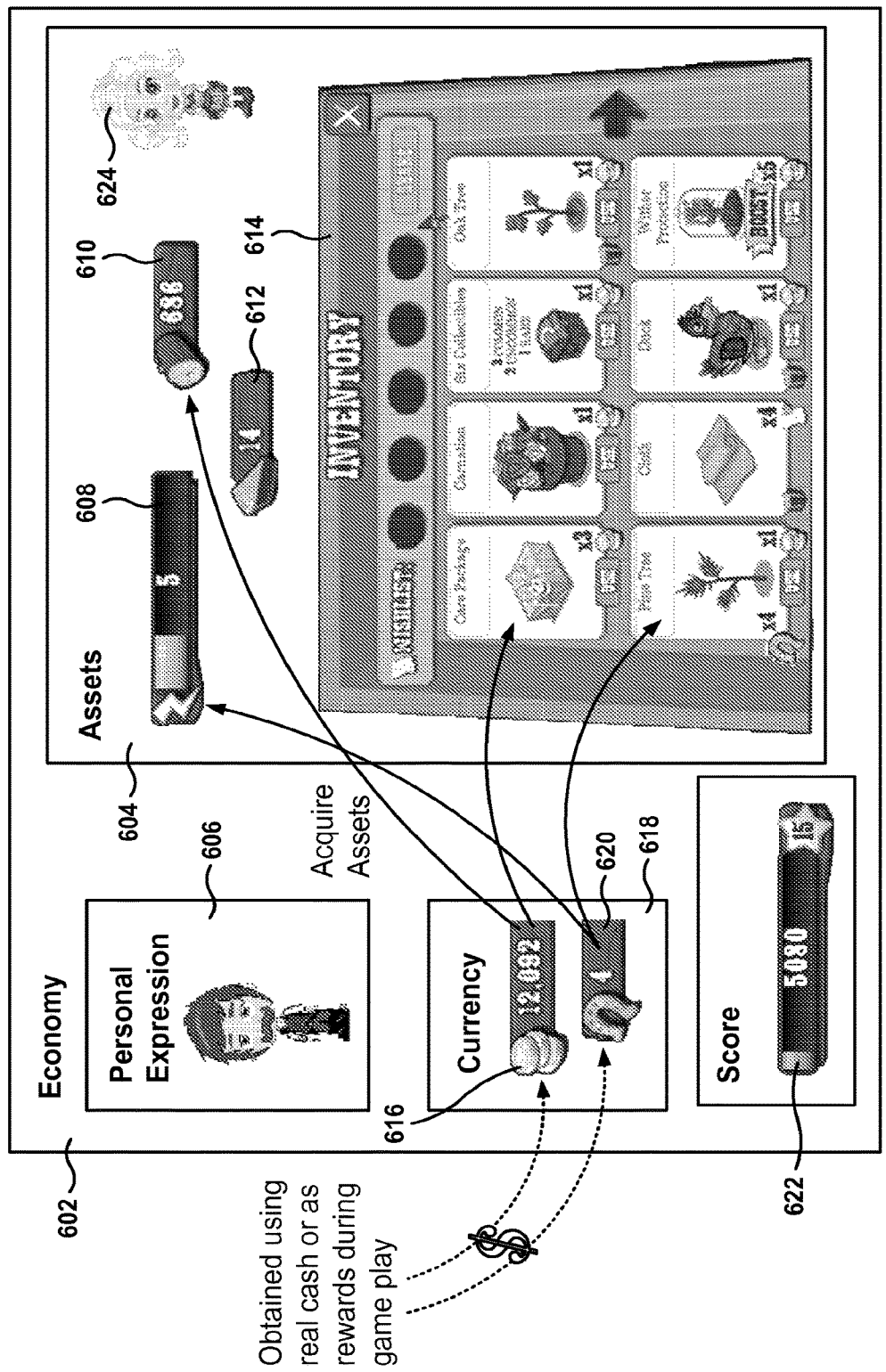
FIG. 6 shows a diagram of the economy of an online game, in accordance with one embodiment.

FIG. 6 shows a diagram of the economy of an online game, in accordance with one embodiment. A game economy is referred to herein as the set of game objects owned by the player during the game that define the resources that the player has acquired while playing the game. In one embodiment, economy 602 includes personal expression 606, currency 616, assets 604, and score 622.

The personal expression includes attributes of the avatar in the game, and the personal expression may include name, type of skin, hair color, mouth, eyes, gender, age, clothing, etc. In one embodiment, the personal expression can be improved by acquiring personal-expression assets, such as fancy clothing including shoes, suits, hats, etc. Currency 618 includes two kinds of virtual currency: virtual currency 616 and virtual currency 620. The virtual currencies can be used to acquire assets during the game, or to make progress (e.g., unblock an obstacle). In one embodiment, virtual currency can be acquired with real currency (e.g., real cash), or virtual currency can be acquired as rewards during game play. Real currency, or legal currency, is any form of currency or credit existing in the real world, such as U.S. dollars, European Euros, British Pounds, etc. The embodiment of FIG. 6 includes two virtual currencies, but other embodiments might include a different number of virtual currencies, such as 1, 3, 4, etc.

Score 622 provides a number associated with the progress of the player in the game. In one embodiment, score 622 also includes an experience level. The experience level is based on the score and the experience level increases as the player reaches certain predetermined score milestones.

As previously described, assets can be organized in categories such as crops, trees, animals, buildings, decorations, energy, special items, weapons, etc. The assets owned by the player include energy level 608, would 610, food 612, spouse avatar 624, care package, carnation, collectibles, oak tree, etc. Inventory 614 is an option in the game that provides one or more screens listing the assets currently owned by the player.

It is appreciated that the embodiment of an economy illustrated in FIG. 6 is exemplary. Other embodiments may utilize different economies, different categories within the economy, or category game objects in other fashion. The embodiment illustrated in FIG. 6 should therefore not be interpreted to be exclusive or limiting, but rather exemplary or illustrative.

Figure 7:
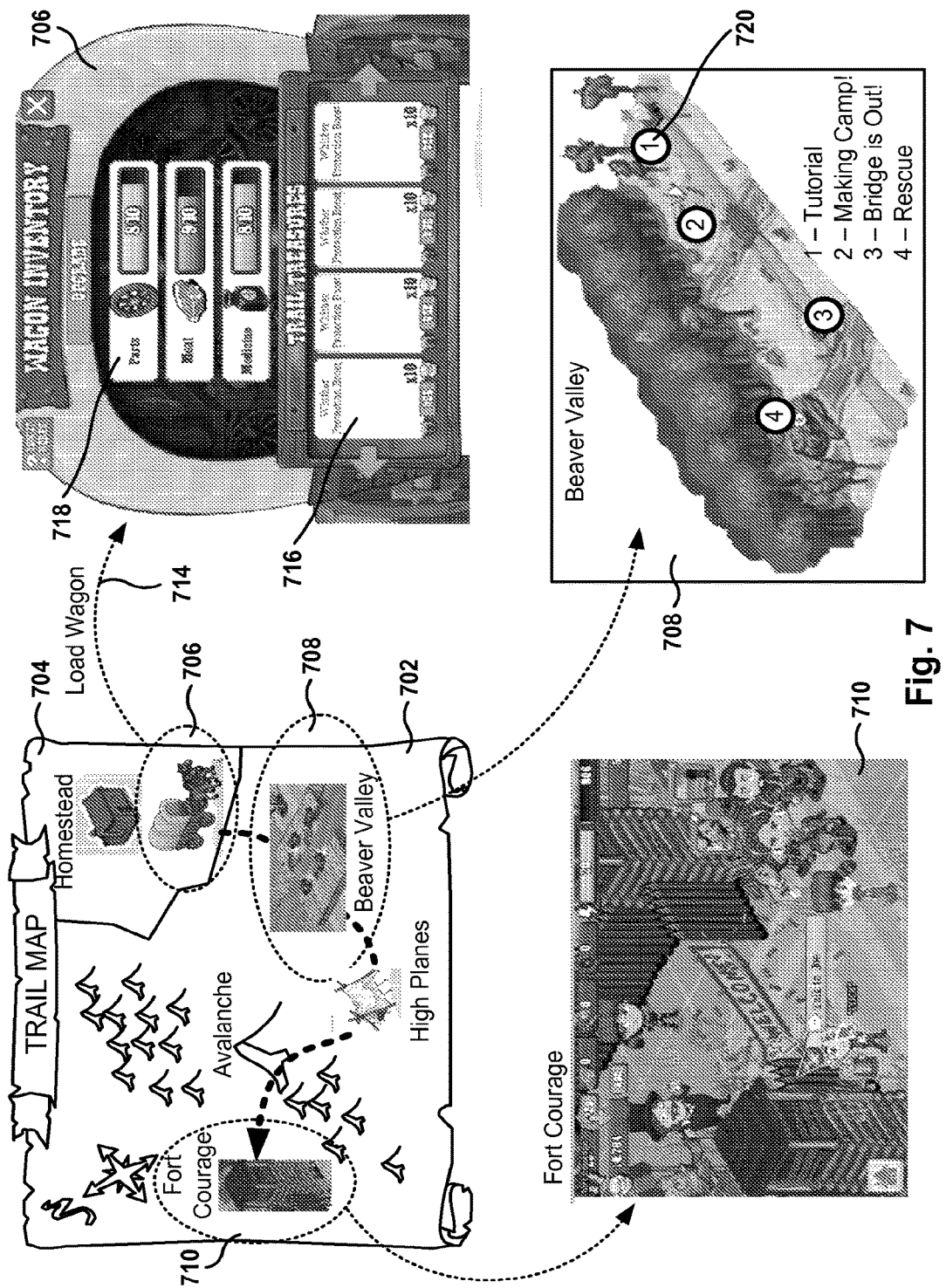
FIG. 7 illustrates the operation of an expedition module within a MMO, according to one embodiment.

FIG. 7 illustrates the operation of an expedition module within a MMO, according to one embodiment. The embodiment of FIG. 7 illustrates a game module name Pioneer Trail, which is integrated with the game named FrontierVille offered by Zynga, the assignee of the present application. A game module (also referred to herein as an extension, an extension module, an expedition, a linear adventure, etc.) is a game that is played autonomously from the online game. Being autonomous means that the game module has its own economy, i.e., the economy of the game module is independent from the economy of the online game. In one embodiment, the transfer of any asset from the online game economy to the game module economy is not allowed, although a limited number of assets may be allowed for transfer between the economies of the online game and the game module. In one embodiment, it is possible to transfer a limited number of assets from the online game to the game module when the game module starts, and a limited number of assets can be awarded at the completion of the game module, where the limited number of assets can be transferred from the game module to the online game.

The online game and the game module share a common game theme. Further, progress in the online game can be made without making progress in the game module, and progress in the game module can be made without making progress in the online game. In one embodiment, the online game and the game module share a personal expression for an avatar controlled by a player.

In yet another embodiment, the game module has its own game module economy and its own game module score. The score in the online game may increase without increasing the game module score, and the score in the game module may increase without ever increasing the online game score.

The names used herein to connote the various games are provided for ease of reference only. However, it is expressly noted that any one of the referenced games or game modules can take on any name, so long as the game provides the claimed functionality or combination of functional features. With this in mind, the functional features of Pioneer Trail will now be described.

In the Pioneer Trail, the player starts an expedition, also referred as journey, trail, linear adventure, autonomous game, or game module, which is an autonomous module within the online game (FrontierVille). In one embodiment, the expedition is a detached integrated story line offering different game experiences beyond those offered in the homestead of FrontierVille.

In one example, the homestead is the focus area for playing the game and where the game's avatar resides. The homestead provides an initial area for the player to roam while playing the game. More specifically, in FrontierVille, the homestead is the plot of land lived on by the avatar (also referred to as pioneer) and eventually the spouse and kid avatars. This parcel of land is given to the Pioneer at the beginning of the game and is full of trees, grass, wildflowers, cactus, thorns, rocks, skulls, etc. Clearing the homestead opens up free space that allows the pioneer to build some buildings, care for animals, or plant trees. The size of the homestead can be upgraded as the game develops. In one embodiment, the homestead is expanded through a purchase with virtual currency. Other players of the game have a homestead of their own and the pioneer may visit neighbor's homesteads to earn rewards when helping neighbors.

In one embodiment, the expedition provides a detached gaming experience, where the player leaves the homestead 704 for new challenges in the expedition. The expedition 702 provides new adventures, new resources, a new point system, a new reward system, competition, a separate economy from the homestead economy, the ability to replay the expedition multiple times, etc. The expedition can also be referred to as an extension to a game. In one embodiment, the expedition (i.e., extension) has a relationship to the online game that is at least partially tied by a theme context. In one embodiment, the events and/or action/interfacing of the extension are different than those of the online game, but may still have some contextual connection to the theme, which may be common.

In the Pioneer Trail game (i.e., the extension), the pioneer (i.e., character or avatar controlled by the user) needs to invite friends to assume roles as the player's Trail Crew to maximize gameplay progress and rewards: a hunter who rustles the food, a carpenter who acquires "parts", and a doctor who acquires "medicine" for the traveling party. In one example, along the trail, the pioneer can stop at multiple trail areas, such as Beaver Valley 708, High Plains, and Avalanche Pass. Inside each trail area, one or more quests are available for the user, where each quest is a separate adventure from other quests. Again, the names of the trail areas are only provided as examples, and depending on the type of game being played, the game areas in the game will take on the theme of the game. For instance, instead of "trail," the game extension can be a, a distance, of course, a class, a session, a repeatable game mechanic (such as fishing, shooting, fighting, racing), etc. In one embodiment, the game extension can be a program that lasts a period of time or executes one or more game processes to complete one or more tasks. The execution of the process is tied to the display of animation or characters, that are illustrated and interfaced with by a user, when rendered on a display. As noted above, the display can be any type of display, including mobile and non-mobile, wireless or non-wireless.

Returning to the example, in the trail, the pioneer runs into wolves and other wild animals, lost pioneers, avalanches, and traders. There are also social missions, and opportunities to gather virtual currency and assets. At the end of each playable game map or region, and again at the end of the trail at Fort Courage 710, a score is awarded to the pioneer, which allows friends to compete for top spot on the leader board and choose prizes for themselves from a special game market that uses Prize Tickets as the primary currency.

In the homestead, the player has assets like decorations, inventory, personal experience, etc. The personal experience, in whole or in part, may be transferred to the expedition. However, only a small number of assets, if any, are brought 714 to play in the expedition. In one embodiment, the player chooses a set of assets to bring to the expedition. The list of possible assets brought from the homestead onto the Trail 706 is a limited list, because the player cannot bring all the assets from the homestead to the expedition due to the differing economies and gameplay functionality. Again, the terminology is dependent on the theme of the game, and is only provided herein to facilitate discussion of the functionality enabled by the game mechanics.

In one embodiment, the expedition has a virtual currency that is different from the virtual currency in the homestead. In one embodiment, the player does not have access to any currency from the homestead, and must instead acquire new virtual currency for the expedition. While loading the wagon 706, the player is given a chance to acquire assets for the expedition using the virtual currency from the homestead. The player has to choose the type and number of assets to acquire. For example, the player has a limit of 10 parts 718 to bring to the wagon, and the player must decide how many parts, up to 10, to buy for the expedition. A list of parts on sale for the wagon 716 is provided to the user while selecting assets for the wagon 706. Once the player finishes loading the wagon, the assets defined in the wagon are transferred to the expedition. In another embodiment, the wagon is loaded in the expedition using expedition virtual currency. Therefore, the player may acquire assets to be placed in the wagon, and the player must use expedition virtual currency, which means that the player may buy virtual currency with real currency to be able to load more assets in the wagon.

As discussed above, the expedition is divided into trail areas, according to one embodiment. For example, the trail area Beaver Valley 708 includes six different missions 720 including quests that require the player to build a campsite, move the wagon down the trail, repair a bridge needed for the player's wagon to advance, etc. Once the player completes the trail, the game ends at a special trail area, Fort Courage 710. Fort Courage 710 is a hub, and the expedition is over when the player arrives at Fort Courage. From Fort Courage 710, the player can go back to the homestead, or restart the expedition. In one embodiment, the hub is the starting point or ending point for other expeditions. It is noted that the expedition is not a different game, but rather a detached game module within the online game. As noted above, and expedition can be thought of as an extension of a game. In Fort Courage 710, the player is given rewards as well as a final score. In one embodiment, the rewards include assets that can be added to the homestead economy, as described below in more detail with reference to FIG. 8.

In one embodiment, the social relationships defined in the homestead (e.g., neighbors) are also transferred to the expedition, such that interaction with the other social players from within the online game provides advancement in the online game or advancement in the expedition.

Each expedition presents a new economy (including new virtual currency), and in this new economy, the player must play to acquire new resources, new energy, new skills, overcome obstacles, etc. This new economy provides a reset economy with an opportunity for new revenues for the game provider. In addition, the new economy feeds value back to the homestead because some of the expedition rewards can help the player improve the homestead. For example, in one embodiment, meat, medicine, and parts obtained in the quest can be traded for homestead points, skill, Prize Tickets, rations or energy needed to do game actions, etc. Additionally, trail treasures can be helpful in later quests in the trail. The player can start new expeditions, and each time a new expedition is launched, a new expedition economy is created, which means a new opportunity for revenue.

Figure 8:
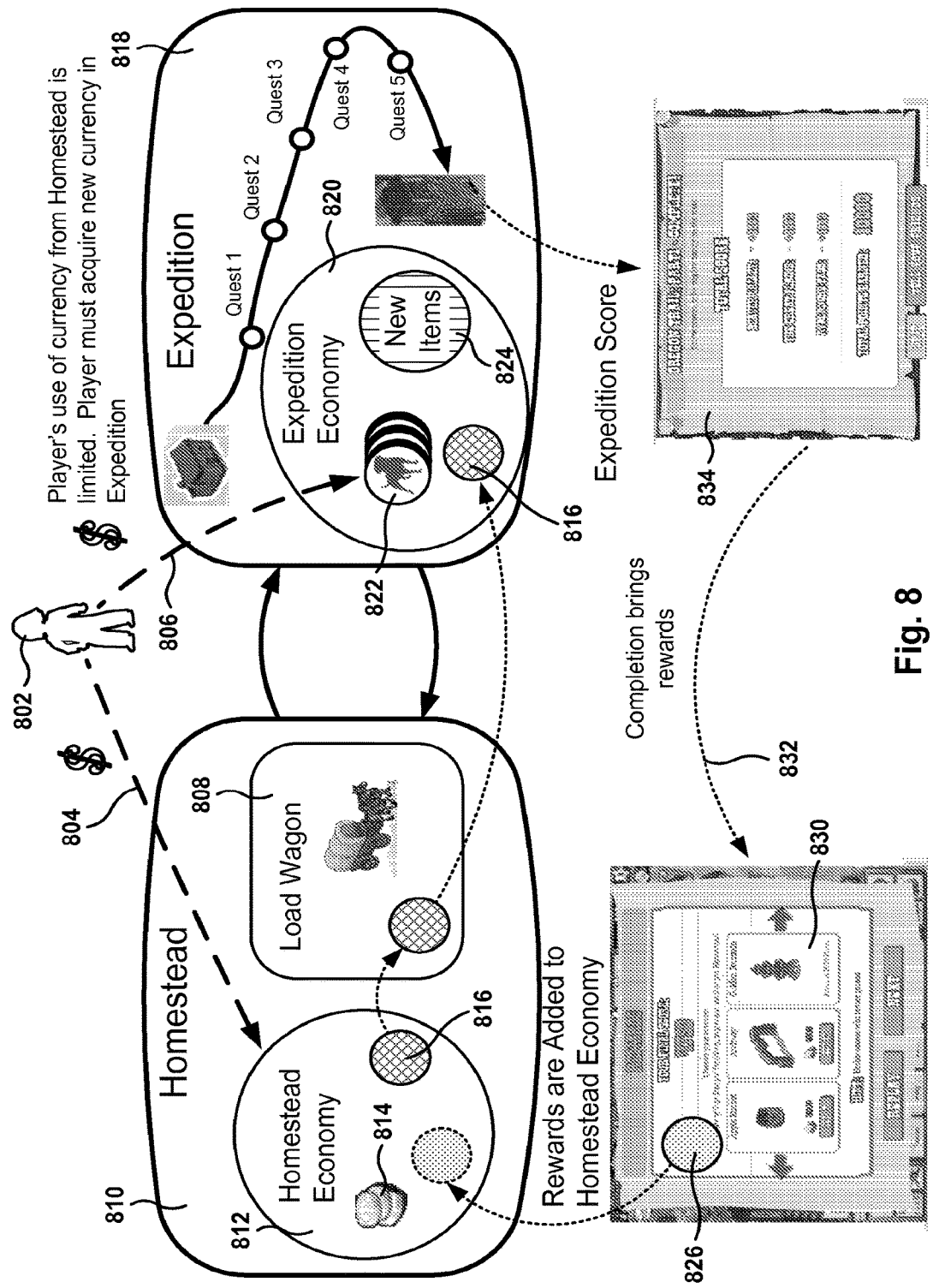
FIG. 8 illustrates the relationship between the homestead economy and the expedition economy, according to one embodiment.

FIG. 8 illustrates the relationship between the homestead economy and the expedition economy, according to one embodiment. As previously described, homestead 810 includes homestead economy 812, which includes one or more virtual currencies 814, assets, etc. In one embodiment, once the player starts the expedition, there is an initial phase for determining which assets 816 can be transferred to the expedition 818, referred to herein as loading the wagon 808.

After the player 802 finishes loading the wagon, the assets 816 in the wagon are transferred to expedition economy 820. Virtual currency 814 can be acquired 804 in exchange for real currency.

Expedition 818 includes: a linear series of quests, and expedition economy 820 (including an expedition score), which is detached and separate from homestead economy 812. The expedition economy 820 includes one or more virtual currencies 822, which can be acquired 806 in exchange for real currency, and new items (e.g., assets, score) that exist in the expedition 818 but that do not exist in homestead 810. It is noted that the use of virtual currency 814 from the homestead economy is limited, or completely disallowed, in the expedition 818.

Expedition virtual currency 822 is traded for advancement in the expedition and cannot be traded for advancement in the homestead outside of the expedition. Further, at least one form of advancement in the expedition can be obtained with the expedition virtual currency 822 and cannot be obtained with the homestead virtual currency 814.

In one embodiment, once the player starts the expedition, there is no return to the homestead until the expedition is completed. In another embodiment, the player can move back and forth between the expedition and the homestead, while keeping the homestead economy and the expedition economy separate. In yet another embodiment, the user can purchase some assets (e.g., energy) in the homestead and then bring those assets to the expedition, but in other embodiments the player is not allowed to transfer any assets between the homestead and the expedition, other than those assets transferred initially in the wagon.

Once the player finishes the expedition 818, a final expedition score 834 is given to the player. After the score is given to the player, the player receives rewards in the form of assets 826 that can be transferred to the homestead economy 812. Therefore, the expedition feeds back into the homestead economy after completion. In one embodiment, the player is offered choices 830 from which to select the rewards.

In one embodiment, the player may have accumulated expedition virtual currency 822, and this expedition virtual currency 822 may have been acquired in exchange for real money. As previously discussed, the expedition can be initiated one more time, but each time the expedition is started, a new expedition economy is created. This means that the virtual currency 822 accumulated at the end of the expedition is practically worthless. To avoid negative feelings by player 802, in one embodiment, the virtual currency 822 acquired during the expedition can be transferred or converted into assets, points, or virtual currency in homestead economy 812.

In one embodiment, at least one form of advancement in the expedition 820 can be obtained with the expedition virtual currency 822 and cannot be obtained with the homestead virtual currency 814. Further, advancement in the expedition increases the expedition score and does not increase the homestead score.

Figure 9:
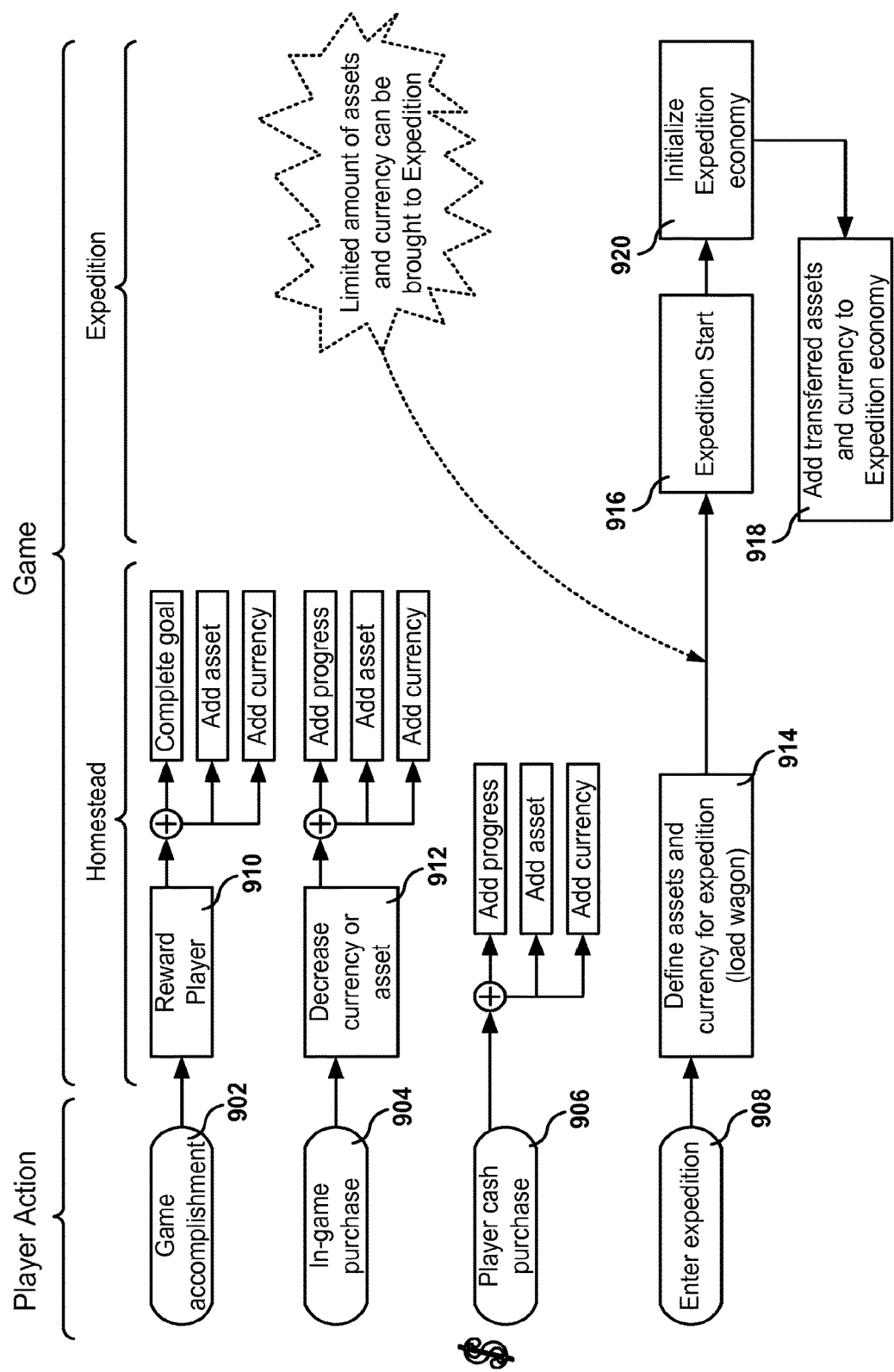
FIG. 9 shows events taking place in the homestead as the game progresses, according to one embodiment.

FIG. 9 shows events taking place in the homestead as the game progresses, according to one embodiment. As the game develops in the homestead, a player obtains game accomplishments 902, such as when completing a mission assigned to the player. As a result of the accomplishment, the game rewards the player 910 in some fashion. For example, the game marks a goal as completed, which typically means that new goals are made available to the player, one or more assets are added to the economy of the homestead, or virtual currency is awarded to the player.

If the player makes an in-game purchase 904, the game decreases 912 the amount of virtual currency used for the purchase, or takes away the asset that was used for the purchase. As a result of the purchase, the homestead game progresses, adds an asset, or gains virtual currency, etc. When the player makes a cash purchase, i.e., the player uses legal currency to acquire virtual currency, the game progresses, adds an asset to the player's economy, or increases the amount of virtual currency, etc.

When the player enters the expedition 908 in the game, the game allows the player to select or define 914 a certain limited amount of assets or currency that can be transferred to the expedition ("loads the wagon"), while still in the homestead. It is noted that a limited amount of assets and virtual currency can be brought to the expedition. In other words, the homestead economy cannot be brought as a whole into the expedition, as the expedition has its own expedition economy. After the expedition starts 916, the game initializes the expedition economy 920, and the game transfers the assets or virtual currency defined in operation 914 to the expedition economy. As discussed above, the expedition economy includes an expedition virtual currency as well as an expedition score. The amount of the expedition virtual currency can be increased in exchange for real currency, where the expedition virtual currency is traded for advancement in the expedition and cannot be traded for advancement in the homestead outside of the expedition. Further, at least one form of advancement in the expedition can be obtained with the expedition virtual currency and cannot be obtained with the homestead virtual currency, where advancement in the expedition increases the expedition score and does not increase the homestead score.

Figure 10:
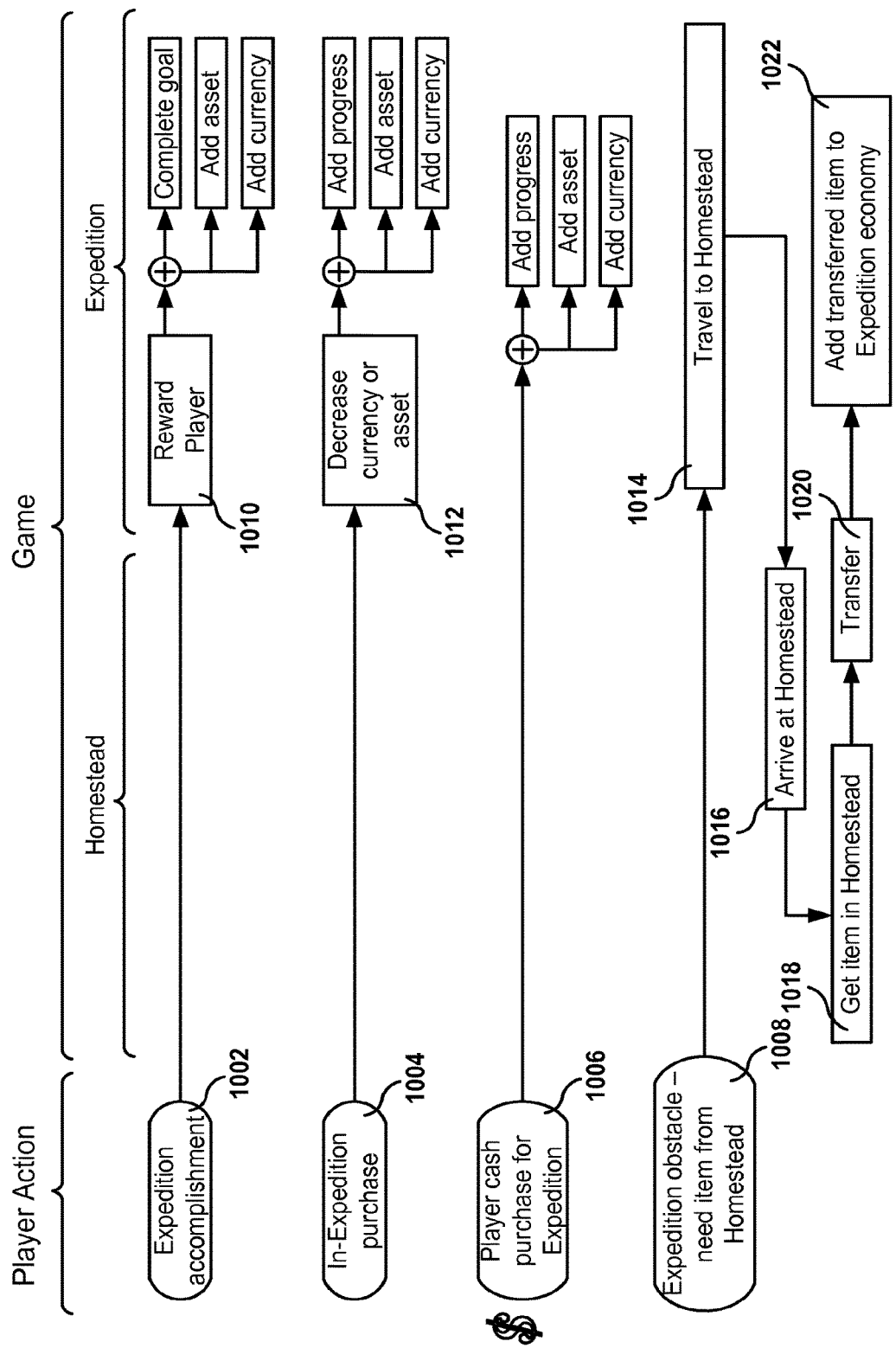
FIG. 10 shows events taking place in the expedition as the game progresses, according to one embodiment.

FIG. 10 shows events taking place in the expedition as the game progresses, according to one embodiment. When some form of accomplishment is obtained in the expedition 1002, the expedition rewards the player 1010. The reward may include the completion of a goal, the addition of one or more assets to the economy, an increase in the amount of expedition virtual currency, etc.

If the player makes a purchase in the expedition 1004, the expedition decreases 1012 the virtual currency or asset in the expedition economy used to make the purchase. The result of the purchase might be making progress in the game, adding an asset, increasing the amount of virtual currency, etc. If the player makes a cash purchase for the expedition 1006, the player gets some form of progress in the game, an asset added to the expedition economy, or have the amount of economy virtual currency increase, etc.

While playing in the expedition, the player might find an obstacle that can be overcome by using some item from the homestead economy 1008. In one embodiment, the player might travel back to the homestead 1014. After the player arrives at the homestead 1016, the player selects or buys the desired item in the homestead (e.g., energy to continue playing the game) 1018. The player may then transfer back 1020 from the homestead to the expedition, and then add the transferred item obtained in the homestead to the expedition economy 1022.

Figure 11:
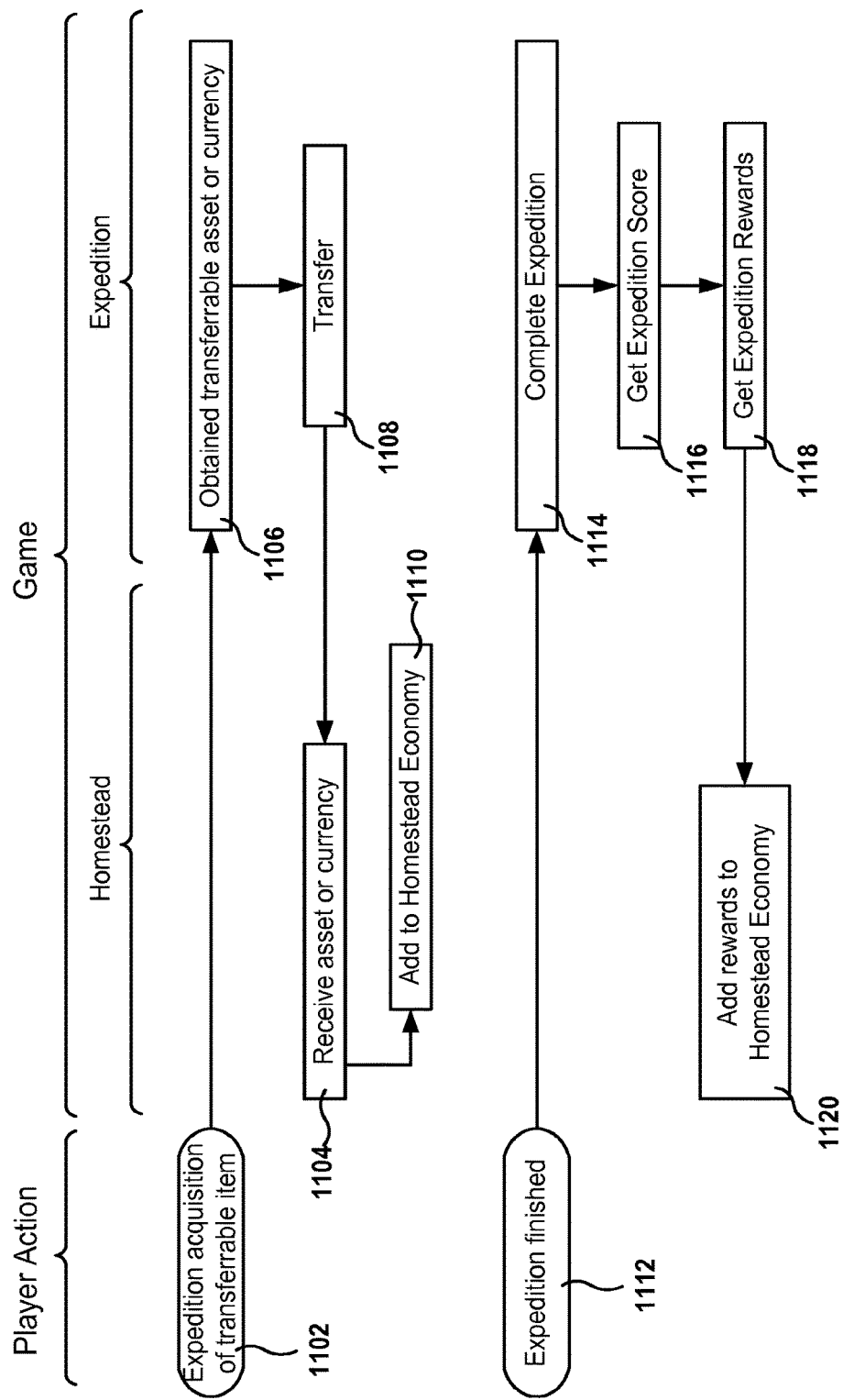
FIG. 11 shows events taking place in the homestead in response to events in the expedition, according to one embodiment.

FIG. 11 shows events taking place in the homestead in response to events in the expedition, according to one embodiment. In one embodiment, items obtained in the expedition economy cannot be transferred to the homestead economy. In another embodiment, a limited amount of items in the expedition economy (e.g., assets or virtual currency) can be transferred to the homestead economy. When the player acquires an item in the expedition that can be transferred 1102, the game awards the player with the transferable asset or virtual currency 1106. Once the player selects to make the transfer 1108, the asset or currency is received 1104 at the homestead, and then the transferred asset or virtual currency is added to the homestead economy 1110.

When the player completes the expedition 1114, the game gives the player an expedition score 1116, and also gives the player one or more expedition rewards 1118. In one embodiment, the player is given a choice of rewards to bring to the homestead economy. After the player gets the rewards, the rewards are added to the homestead economy in the game 1120.

Figure 12:
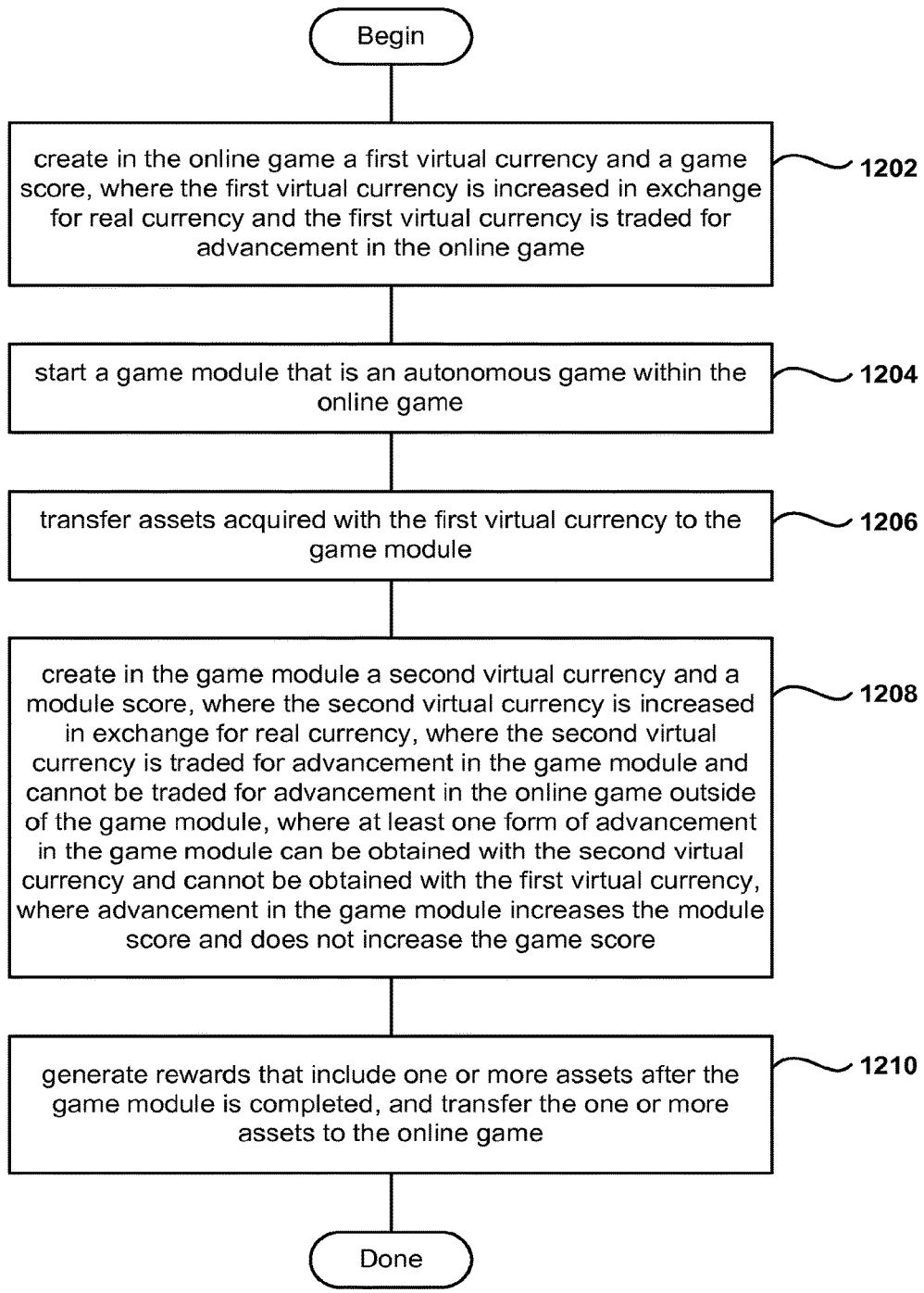
FIG. 12 shows a flowchart illustrating an algorithm for generating revenue in an online game, in accordance with one embodiment of the invention.

FIG. 12 shows a flowchart illustrating an algorithm for generating revenue in an online game, in accordance with one embodiment of the invention. In operation 1202, a first virtual currency and a game score are created in the online game. The amount of the first virtual currency can be increased in the online game in exchange for real currency, wherein the first virtual currency can be traded for advancement in the online game. For example, 1,000 virtual gold coins can be purchased using a credit card for 5 dollars in an online transaction.

After operation 1202, the method continues to operation 1204, where a game module (e.g., an expedition) is started. The game module is an autonomous game, which is autonomous from the online game and is also within the online game. In one embodiment, being autonomous means that the game module has its own economy. In another embodiment, being autonomous means that the game module has its own economy and its own score.

In one embodiment, the player acquires assets in the online game using the first virtual currency for transfer to the game module. In operation 1206, the assets acquired with the first virtual currency are transferred to the game module. In operation 1208, a second virtual currency and a module score are created in the game module. The amount of second virtual currency can be increased in exchange for real currency. Additionally, the second virtual currency can be traded for advancement in the game module, but the second virtual currency cannot be traded for advancement in the online game outside of the game module. Further, at least one form of advancement in the game module can be obtained using the second virtual currency, but cannot be obtained using the first virtual currency. Advancement in the game module increases the module score, but does not increase the game score.

From operation 1208, the method flows to operation 1210 where rewards are generated after completing the game module. The rewards include one or more assets that are transferred to the online game after completing the game module.

Figure 13:
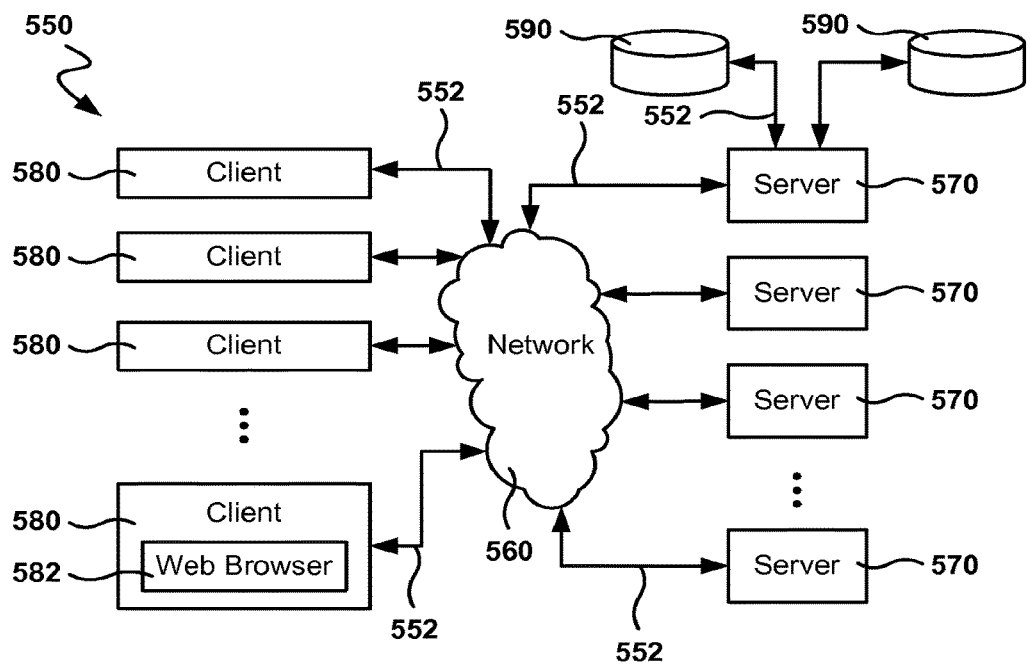
FIG. 13 illustrates an example network environment suitable for implementing embodiments of the invention.

FIG. 13 illustrates an example network environment 550 suitable for implementing embodiments of the invention. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HTML files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a netbook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as MICROSOFT INTERNET EXPLORER, GOOGLE CHROME, or MOZILLA FIREFOX, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 14:
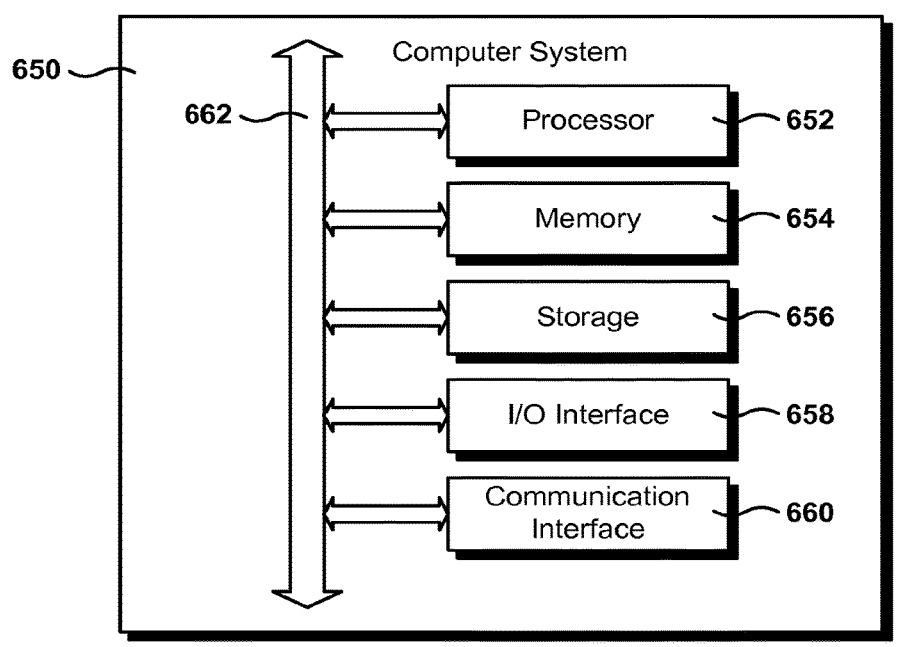
FIG. 14 illustrates an example computer system for implementing embodiments of the invention.

FIG. 14 illustrates an example computer system 650 for implementing embodiments of the invention. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute or data for processor 652 to operate on. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include an HDD, a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. § 101.

One or more embodiments of the present invention can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method, comprising:
executing, at a server, a first video game for play by a user of a client device, the first video game having a first currency enabling the user to achieve advancement in the first video game;
executing, at the server, a second video game that is an autonomous game module within the first video game, the second video game enables the user to select one or more assets from the first video game for use in the second video game, the second video game limiting a number of assets the user is able to select such that when selected, the one or more assets are insufficient to complete the second video game, wherein the second video game has a second currency enabling the user to achieve advancement in the second video game, and wherein the first currency is prevented from enabling the user to achieve the advancement in the second video game and the second currency is prevented from enabling the user to achieve the advancement in the first video game;
detecting, at the server, completion of the second video game by the user and selecting one or more reward assets for use in the first video game, the one or more reward assets are different from the one or more assets selected from the first video game for use in the second video game; and
transferring the one or more reward assets to the first video game for the user to use to achieve the advancement in the first video game.

2. The method of claim 1, wherein the second video game is defined by a series of quests, each quest within the series of quests is unlocked for gameplay by completing a prior quest within the series of quests.

3. The method of claim 1, further comprising:
generating a rewards interface for display on the client device for enabling the user to choose the one or more reward assets from a plurality of award assets for said selecting by the server.

4. The method of claim 1, wherein the first currency is increased in exchange for real currency and wherein the second currency is increased in exchange for real currency.

5. The method of claim 1, further comprising:
executing, at the server, a third video game that is an autonomous game module within the first video game subsequent to completion of the second video game by the user, the third video game has the second currency that is reset by the server.

6. The method of claim 1, further comprising:
executing, at the server, a third video game that is an autonomous game module within the first video game subsequent to completion of the second video game by the user, the third video game has a third currency enabling the user to achieve advancement in the third video game, wherein the first currency is prevented from enabling the user to achieve the advancement in the third video game and the third currency is prevented from enabling the user to achieve the advancement in the first video game.

7. The method of claim 1, wherein the first video game is associated with a game board and wherein the second video game is based on a theme of the game board of the first video game.

8. The method of claim 1, wherein the second video game enables the user to travel back to the first video game to purchase an asset that cannot be purchased in the second video game, the second video game enabling the user to transfer the asset when purchased to the second video game when the user travels back to the second video game, the asset when transferred enables the user to achieve the advancement in the second video game.

9. The method of claim 1, wherein advancement in the second video game includes one of obtaining an asset, completing a game task, or removing an obstacle.

10. A server system for hosting a first video game and a second video game that is an autonomous game module within the first video game for play by a user on a client device, comprising:
a memory for storing instructions for executing the first video game and instructions for executing the second video game, the first video game having a first currency enabling the user to achieve advancement in the first video game; and
a processor operable to execute the instructions for the first video game and the instructions for the second video game, wherein during execution of the instructions for the first video game and the instructions for the second video game the processor is operable to:
initiate the first video game having the first currency;
initiate the second video game, the second video game enables the user to select one or more assets from the first video game for use in the second video game, the second video game limiting a number of assets the user is able to select such that when selected, the one or more assets are insufficient to complete the second video game, wherein the second video game has a second currency enabling the user to achieve advancement in the second video game, and wherein the first currency is prevented from enabling the user to achieve the advancement in the second video game and the second currency is prevented from enabling the user to achieve the advancement in the first video game;

detect completion of the second video game by the user and select one or more reward assets for use in the first video game, the one or more reward assets are different from the one or more assets selected from the first video game by the user for use in the second video game; and transfer the one or more reward assets to the first video game for the user to use to achieve the advancement in the first video game.

11. The server system of claim 10, wherein the second video game is defined by a series of quests, each quest within the series of quests is provided for gameplay subsequent to completion of a prior quest within the series of quests.

12. The server system of claim 10, wherein the first video game includes a plurality of autonomous game modules, the second video game is one of the plurality of autonomous game modules.

13. The server system of claim 10, wherein the processor is further operable to:

generate a rewards interface for display on the client device for enabling the user to choose the one or more rewards from a plurality of reward assets for the processor to select.

14. The server system of claim 10, wherein the processor is further operable to:

initiate a third video game that is an autonomous game module within the first video game subsequent to completion of the second video game by the user, the third video game has the second currency that is reset by the server system.

15. The server system of claim 10, wherein the processor is further operable to:

executing a third video game that is an autonomous game module within the first video game subsequent to completion of the second video game by the user, the third video game has a third virtual currency enabling the user to achieve advancement in the third video game, wherein the first currency is prevented from enabling the user to achieve the advancement in the third video game and the third virtual currency is prevented from enabling the user to achieve the advancement in the first video game.

16. The server system of claim 10, wherein the first video game is associated with a game board and wherein the second video game is based on a theme of the game board of the first video game.

17. The server system of claim 10, wherein the second video game enables the user to travel back to the first video game to purchase an asset that cannot be purchased in the second video game, the second video game enabling the user to transfer the asset when purchased to the second video game when the user travels back to the second video game, the asset when transferred enables the user to achieve the advancement in the second video game.

18. The server system of claim 10, wherein advancement in the second video game includes one of obtaining an asset, completing a game task, or removing an obstacle.

19. A non-transitory computer-readable storage medium storing a computer program executable by a processor-based system, comprising:

program instructions for executing a first video game for play by a user of a client device, the first video game having a first currency enabling the user to achieve advancement in the first video game;

program instructions for executing a second video game that an autonomous game module within the first video game, the second video game enables the user to select one or more assets from the first video game for use in the second video game, the second video game limiting a number of assets the user is able to select such that when selected, the one or more assets are insufficient to complete the second video game, wherein the second video game has a second currency enabling the user to achieve advancement in the second video game, and wherein the first currency is prevented from enabling the user to achieve the advancement in the second video game and the second currency is prevented from enabling the user to achieve the advancement in the first video game;

program instructions for detecting completion of the second video game by the user and selecting one or more reward assets for use in the first video game, the one or more reward assets are different from the one or more assets selected from the first video game for use in the second video game; and program instructions for transferring the one or more reward assets to the first video game for the user to use to achieve the advancement in the first video game.

20. The non-transitory computer-readable storage medium of claim 19, wherein the second video game is defined by a series of quests, each quest within the series of quests is unlocked for gameplay by completing a prior quest within the series of quests.

* * * * *